(12) United States Patent
Illner et al.

(10) Patent No.: US 9,203,099 B2
(45) Date of Patent: Dec. 1, 2015

(54) FUEL CELL ASSEMBLY AND METHOD FOR OPERATING A FUEL CELL ASSEMBLY

(75) Inventors: Dieter Illner, Erlangen (DE); Josef Lersch, Heroldsbach (DE); Arno Mattejat, Erlangen (DE); Walter Stuehler, Hirschaid (DE); Franco Tardivo, Erlangen (DE); Ottmar Voitlein, Lonnerstadt (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 217 days.

(21) Appl. No.: 13/201,755

(22) PCT Filed: Jan. 27, 2010

(86) PCT No.: PCT/EP2010/050906
§ 371 (c)(1),
(2), (4) Date: Aug. 16, 2011

(87) PCT Pub. No.: WO2010/091952
PCT Pub. Date: Aug. 19, 2010

(65) Prior Publication Data
US 2011/0300458 A1 Dec. 8, 2011

(30) Foreign Application Priority Data
Feb. 16, 2009 (EP) .................................... 09152893

(51) Int. Cl.
*H01M 8/04* (2006.01)
*H01M 8/24* (2006.01)
(Continued)

(52) U.S. Cl.
CPC ............ *H01M 8/04149* (2013.01); *H01M 8/04* (2013.01); *H01M 8/04126* (2013.01);
(Continued)

(58) Field of Classification Search
CPC ... H01M 2/32; H01M 8/0271; H01M 8/0297; H01M 8/04; H01M 8/04082; H01M 8/04126; H01M 8/04223; H01M 8/04246; H01M 8/04858; H01M 8/0488
USPC .......................... 429/413, 414, 437, 450, 453
See application file for complete search history.

(56) References Cited

U.S. PATENT DOCUMENTS

| 3,964,929 A | 6/1976 | Grevstad |
| 6,582,840 B2 | 6/2003 | Hortop |

(Continued)

FOREIGN PATENT DOCUMENTS

| DE | 100 49 801 A1 | 4/2001 |
| DE | 10 2004 049 127 A1 | 4/2006 |

(Continued)

*Primary Examiner* — Jonathan G Leong
*Assistant Examiner* — James Erwin
(74) *Attorney, Agent, or Firm* — Laurence Greenberg; Werner Stemer; Ralph Locher (57) ABSTRACT

A fuel cell assembly includes a fuel cell configuration having a solid electrolyte-based fuel cell with terminal contacts tapping an electrical voltage from the fuel cell configuration between which the fuel cell is disposed. An assembly has an electrically conductive component and another component disposed between a first terminal contact and the electrically conductive component on the side of the first terminal contact away from the fuel cell and has a lower electrical conductivity than that thereof. A supply duct transports a fluid medium connecting the first terminal contact to the electrically conductive component through the other component. The electrically conductive component is connected to the first terminal contact and/or a voltage supply adjusting an electrical potential on the electrically conductive component to an electrical potential on the first terminal contact. There is a maximum potential difference of 3 volts between the electrically conductive component and the first terminal contact.

14 Claims, 4 Drawing Sheets

(51) Int. Cl.
*H01M 2/32* (2006.01)
*H01M 8/10* (2006.01)

(52) U.S. Cl.
CPC ...... *H01M8/04223* (2013.01); *H01M 8/04246* (2013.01); *H01M 8/2465* (2013.01); *H01M 2/32* (2013.01); *H01M 2008/1095* (2013.01); *Y02E 60/50* (2013.01)

(56) References Cited

U.S. PATENT DOCUMENTS

| | | | |
|---|---|---|---|
| 6,653,008 | B1 | 11/2003 | Hirakata et al. |
| 2003/0193009 | A1 | 10/2003 | Dill |
| 2004/0028974 | A1* | 2/2004 | Green et al. .................. 429/30 |
| 2005/0064257 | A1 | 3/2005 | Isoda et al. |

FOREIGN PATENT DOCUMENTS

| | | |
|---|---|---|
| EP | 1 223 631 A2 | 7/2002 |
| EP | 1 519 436 A1 | 3/2005 |
| JP | 2-21573 A | 1/1990 |
| WO | 2006/039901 A1 | 4/2009 |

\* cited by examiner

FUEL CELL ASSEMBLY AND METHOD FOR OPERATING A FUEL CELL ASSEMBLY

BACKGROUND OF THE INVENTION

Field of the Invention

The invention relates to a fuel cell assembly and a method for operating such an assembly, comprising at least one fuel cell device with at least one solid electrolyte based fuel cell, wherein at least two terminal contacts, between which the at least one fuel cell is disposed, are provided for tapping off an electrical voltage produced by the fuel cell device, wherein at least one subassembly is present which has at least one electrically conductive component and at least one other component, wherein the at least one other component is disposed between a first of the terminal contacts and the at least one electrically conductive component on the side of the first terminal contact facing away from the at least one fuel cell and has a lower electrical conductivity than the latter, and wherein at least one supply duct for conveying a fluid medium is present which connects the first terminal contact to the at least one electrically conductive component through the at least one other component.

WO 03/030287 A2 discloses a fuel cell device having a stack of planar fuel cells and additionally a subassembly in the form of a humidifying device comprising a stack of planar humidifier cells.

In a fuel cell, an electric current is produced with high efficiency by the electrochemical combination of hydrogen and oxygen on an electrolyte. Pure hydrogen, an oxygen-containing gas mixture (reformer gas) or a gaseous hydrocarbon such as methane, for example, is used as a fuel gas providing the hydrogen. Pure oxygen or an oxygen-containing gas such as air, for example, is used as the oxidation gas providing the oxygen. With pure hydrogen and pure oxygen, a reaction to water ($H_2O$) takes place on the electrolyte, without pollutant emission. The technical implementation of the fuel cell principle has resulted in different solutions, namely using a great variety of electrolytes and operating temperatures between 60 and 1000° C. For example, both liquid and solid electrolytes are used. Depending on their operating temperature, fuel cells are classified into low, medium and high temperature fuel cells which in turn differ in terms of their technical design.

A single fuel cell produces a maximum operating voltage of about 1.1 V. Therefore, a plurality of fuel cells are stacked vertically and/or horizontally to form a fuel cell device. By connecting the individual fuel cells in series, an operating voltage of 100 V or more is achieved.

The term "planar fuel cell" is used here and hereinafter to denote a fuel cell comprising a planar i.e. disk-, plate- or foil-type solid electrolyte bordered on one side by an anode layer and on the other side by a cathode layer. The two electrodes together with the electrolyte constitute a so-called electrolyte/electrode unit. Disposed adjacent to the anode is an anode gas chamber into which the fuel gas is introduced. Disposed adjacent to the cathode is a cathode gas chamber into which the oxidation gas is introduced.

A bipolar plate is usually disposed between the anode gas chamber of a planar fuel cell and the cathode gas chamber of an adjacently disposed planar fuel cell. The bipolar plate establishes an electrically conducting connection between the anode of the first mentioned fuel cell and the cathode of the adjacent fuel cell. Depending on the type of fuel cell, a bipolar plate is implemented, for example, in the form of a metal plate or as a cooling element comprising two vertically stacked plates with an intervening cooling water chamber. Depending on the design of the fuel cells, a fuel cell device contains additional components such as electrically conducting layers, sealing arrangements or pressure pads.

The fuel cells of a fuel cell device are continuously supplied with fuel gas and oxidation gas during their operation. Many types of low temperature fuel cells, particularly fuel cells with a polymer electrolyte membrane (PEM fuel cells), require humidified operating gases in order to work. These operating gases are humidified with steam in a suitable device such as, for example, a humidifying device in the form of a liquid ring compressor or a membrane humidifier. A membrane humidifier usually comprises a water permeable membrane which separates a gas chamber from a humidifying water chamber. Cooling water from the fuel cells is frequently used as humidifying water which is passed through the humidifying water chamber. The cooling water heated to the temperature of the fuel cells flows through the humidifying water chamber, penetrates the water permeable membrane and humidifies the fuel gas and/or oxidation gas to approximately 100% humidity. The humidified gases are then fed to the fuel cells. Since heat from the fuel gas or oxidation gas is consumed as heat of evaporation because of the evaporation of the humidifying water from the water permeable membrane into the gas chamber, its temperature falls to an often considerable extent.

In order to keep the temperature of the fuel gases and/or oxidation gases approximately the same, at least one heating element is therefore frequently assigned to a water permeable membrane in a humidifying device. A heating element is frequently implemented such that the fuel gas or oxidation gas flows along the heating element during the humidification process and is brought to approximately the temperature of the fuel cells or maintained there. A heating element is here brought to the temperature of the fuel cells in a particularly simple manner by being designed to provide a flow path for the cooling water from the fuel cells. For this purpose the fuel cell device has at least one supply duct for conveying cooling water which is heated up to the temperature of said fuel cells.

The heated cooling water is then conveyed through a heating element, wherein the fuel gas and/or oxidation gas passing along said heating element is brought to approximately the temperature of the fuel cells. The temperature of the humidifying water is also matched to that of the fuel cells in a particularly simple manner if one part of the heated cooling water from the fuel cells is conveyed as heating water for the heating element and another part of the heated cooling water is fed to the humidifying water chamber as humidifying water. The cooling water supply duct passing through the fuel cell device is therefore disposed such that the heated cooling water conveyed through consequently flows through the heating element(s) of the membrane humidifier as well as the humidifying water chamber(s) of the membrane humidifier. Sheet metal elements in or between which a heating water chamber is formed have proved to be particularly space saving heating elements.

A fuel cell assembly comprising a fuel cell device and at least one additional subassembly is usually implemented in an electrically insulated manner from its surroundings so that the current produced by the fuel cell device is fed to the load or loads solely via the desired load connections, i.e. terminal contacts. The terminal contacts are frequently provided by electrically conductive, in particular metal pole plates. The quality of said electrical insulation is defined by the size of an insulation resistance between individual components of a fuel cell assembly which are live, and such elements of the fuel cell assembly which are not live. A small current, the so-called leakage current, flows via this insulation resistance. Although this normally causes no damage, it can result in a measurable voltage drop. Said insulation resistance can be provided, for example, by a component made of plastic, ceramic, textile material and the like, generally acting as insulators.

The insulation resistance can be affected by media which supply the fuel cell assembly with operating gases, cooling water and the like, if these media are electrical conductors via which an appreciable leakage current can flow. An appreciable leakage current is produced, for example, via media which contain water or steam. In the case of a correspondingly high voltage drop, the voltage can attain the corrosion potential of electrically conductive, in particular metal, materials, which are in contact with such a medium, so that electrically conductive components made of these materials may be attacked by corrosion or destroyed. In addition, this causes corrosion products to be produced which are possibly carried further in supply ducts adjacent to the corroded component by a medium flowing therein, resulting in blockages or other undesirable secondary effects at other locations. This is particularly disadvantageous in the case of a fuel cell assembly with an internal distribution structure (internally manifolded stack), as the supply ducts are nor readily accessible from the outside or cleanable. The amount of corrosion products formed depends on the magnitude of the leakage current, a leakage current of as little as a few mA resulting in some circumstances in the formation of appreciable amounts of undesirable corrosion products.

Design measures have hitherto been used to prevent or minimize the corrosive effects of any leakage current occurring. In the event that the leakage current flows through an aqueous medium such as cooling water, the cross-section of the supply duct through which the aqueous medium is conveyed is selected as small as possible and its length as long as possible. In addition, the supply duct's surface region delimiting the aqueous medium or the material constituting the supply duct is made of an electrically insulating material. However, this is only achievable at acceptable cost/complexity if, for example, tubes or the like delimit the supply duct. In the case of supply ducts with irregular or changing duct cross-section, this is not practicable or requires significant cost/complexity.

U.S. Pat. No. 3,964,292 describes a cooling system for a fuel cell wherein a leakage current flowing via the coolant lines is to be minimized by subdividing the cooling system into a plurality of small subsections and connecting the latter to intermediate potentials. As already explained above, the residual potential differences inside a fuel cell stack result in undesirable corrosion phenomena.

DE 100 49 801 A1 discloses a fuel cell system which is implemented by connecting four fuel cell stacks via a supply/discharge box. A cooling water supply opening and a cooling water discharge opening are short-circuited by a cable, thereby eliminating the electrical potential difference between them. This prevents current from flowing within the cooling water itself. A current flow because of a potential difference occurs here between the cooling water supply opening and the cooling water discharge opening. The rest of the cooling water system is electrically shielded.

BRIEF SUMMARY OF THE INVENTION

The object of the invention is to provide an improved fuel cell assembly and an improved method for operating a fuel cell assembly, wherein the occurrence of corrosion caused by a leakage current can be prevented or reduced.

For the fuel cell assembly comprising
at least one fuel cell device with at least one solid electrolyte based fuel cell, wherein at least two terminal contacts, between which the least one fuel cell is disposed, are provided for tapping off an electrical voltage produced by the fuel cell device,
at least one subassembly having at least one electrically conductive component and at least one other component, wherein the at least one other component is disposed between a first of the terminal contacts and the at least one electrically conductive component on the side of the first terminal contact facing away from the at least one fuel cell and has a lower electrical conductivity than the latter, and
at least one supply duct for conveying a fluid medium, said duct connecting the first terminal contact to the at least one electrically conductive component through the at least one other component, this object is achieved as follows: the at least one electrically conductive component is connected to the first terminal contact and/or at least one voltage supply such that an electrical potential at the at least one electrically conductive component is matched to an electrical potential present at the first terminal contact, a maximum potential difference of 3 volts being present between the at least one electrically conductive component and the first terminal contact.

This object is achieved for the method for operating a fuel cell assembly, in particular the fuel cell assembly according to the invention, wherein the fuel cell assembly comprises at least one fuel cell device with at least one solid electrolyte based fuel cell, wherein at least two terminal contacts between which the at least one fuel cell is disposed are provided for tapping off an electrical voltage produced by the fuel cell device, additionally comprises at least one subassembly which has at least one electrically conductive component and at least one other component, wherein the at least one other component is disposed between a first of the terminal contacts and the at least one electrically conductive component on the side of the first terminal contact facing away from the at least one fuel cell and has a lower electrical conductivity than the latter, and comprises at least one supply duct for conveying a fluid medium, said duct connecting the first terminal contact to the at least one electrically conductive component through the at least one other component, wherein the at least one electrically conductive component is connected to the first terminal contact and/or at least one voltage supply such that an electrical potential at the at least one electrically conductive component is matched to an electrical potential present at the first terminal contact, a maximum potential difference of 3 volts being present between the at least one electrically conductive component and the first terminal contact.

By matching the electrical potential at the at least one electrically conductive component to the electrical potential at the first terminal contact, the formation of a leakage current between them is prevented or at least significantly prevented, so that the corrosion potential of the electrically conducting, in particular metal, materials of the electrically conductive components is no longer attained. Corrosion of the electrically conductive components and the formation of the unwanted corrosion products which are distributed i.e. entrained away from their point of origin with a flowing medium in adjacent supply ducts is therefore reliably avoided. As a result, the operating life of the fuel cell assembly is significantly extended and operating malfunctions are reduced.

The fuel cell assembly according to the invention and the method according to the invention are suitable for fuel cell systems with externally and internally manifolded stacks, but particularly for a fuel cell assembly with internally manifolded stack wherein the supply ducts, in particular for cooling and/or heating water and/or for fuel gas and/or oxidation gas, etc., pass through the interior of the fuel cell assembly, i.e. are incorporated therein.

Depending on requirements, only one or both of the terminal contacts of the fuel cell device can be connected in an electrically conducting manner in each case to one or more electrically conductive components for the purpose of potential equalization.

Matching of an electrical potential at an electrically conductive component to an electrical potential at a terminal contact is provided according to the invention if the same or approximately the same potential is present at these, a maximum potential difference of about 3 V being present.

The at least one other component is made in particular of an electrically insulating or essentially electrically insulating material such a ceramic, plastic or glass. It provides an insulation resistance between individual components of a fuel cell assembly which are live (e.g. a terminal contact), and electrically conductive elements of the fuel cell assembly which are not live.

According to the invention, all the electrically conductive components which are operated in a temperature range in which the fuel cell can be operated and/or are disposed at a distance of up to 10 m from a terminal contact or from an electrically conductive component at the same electrical potential as a terminal contact—calculated along a supply duct connecting the terminal contact and the respective electrical component—are placed at the same or approximately the same electrical potential of a terminal contact.

In a preferred embodiment of the fuel cell assembly, the at least one supply duct is designed to convey a fluid medium in the form of water and/or steam and/or a steam-containing gas and extends through the at least one subassembly and the at least one fuel cell device. As water or steam-containing media greatly reduce the insulation resistance between electrically conductive components which, although spaced apart from one another, are both in contact with the medium, there is here the risk of the formation of particularly high leakage currents and consequently of corrosive effects. The inventive potential equalization between the first terminal contact and the at least one electrically conducting component results in the leakage current via the medium being reduced or eliminated and provides effective corrosion protection for the electrically conductive components.

The invention can in particular also be used if the at least one subassembly has at least two electrically conductive components and at least two other components, wherein an electrically conductive component is disposed between two other components and/or another component is disposed between two electrically conductive components. In such a case, the electrical potential at each electrically conductive component present is preferably matched to the electrical potential obtaining at the first terminal contact. This eliminates or largely prevents the formation of any leakage current and, consequently, corrosion on all electrically conductive components present.

In the case of such an alternating arrangement of electrically conductive and electrically insulating or essentially electrically insulating other components, the conductive components are interconnected in series and/or parallel in an electrically conducting manner and connected to the first terminal contact and/or the at least one voltage supply.

It has proved effective if the first terminal contact and the at least one electrically conductive component are interconnected by means of at least one electrically conductive link.

It has proved effective if said electrically conductive link is made of metal, a metal alloy, an electrically conductive plastic, carbon, graphite or an electrically conducting composite material, e.g. based on metal and plastic, graphite and plastic or carbon and plastic.

Links made of metal or metal alloys are here preferably implemented in the form of wires, plates, braids, knitted fabrics, woven fabrics, mechanical springs or sheet metal parts with resilient convexities. Links made of carbon, particularly in the form of carbon paper, and links made of graphite, particularly in the form of graphite felt or electrode graphite, are used. Links made of electrically conductive plastics preferably consist of plastics filled with graphite and/or metal.

It has proved advantageous if the at least one electrically conductive link interconnects the first terminal contact and the at least one electrically conductive component on a periphery and/or in the interior of the at least one fuel cell device and of the at least one subassembly. A link disposed on the exterior or rather on the surface of the fuel cell device and of the at least one subassembly is easily accessible and can also be retrofitted in a simple manner. Metal wires, plates, metal braids, etc. have proved particularly suitable as links.

It has likewise proved effective if the at least one electrically conductive link is implemented as a separator made of an electrically conductive material, e.g. an electrically conducting plastic or an electrically conducting ceramic, and connects the first terminal contact to the at least one electrically conductive component. A separator of this kind is preferably implemented in the form of a seal, in particular a flat gasket. Such a separator can be located in the region of the periphery of the fuel cell assembly and be externally accessible, extend into the interior of the fuel cell assembly and/or extend in an externally inaccessible manner inside the fuel cell assembly.

It has likewise proved effective if the first terminal contact is connected by means of the at least one electrically conductive link to the at least one electrically conductive component through at least one separate duct or a supply duct. The at least one link is in this case disposed inside the fuel cell device(s) and subassembly (subassemblies), and is therefore not directly accessible from the outside. This is advantageous particularly for rebuilding fuel cell assemblies, during which the individual components are fitted together. The external dimensions of the fuel cell assembly are not changed by links incorporated into ducts or supply ducts. This enables potential equalization to be implemented in a space saving and miniaturized manner.

A supply duct provides a flow path for a fluid medium, so that a link installed therein must be implemented so as to be permeable to said medium and must not significantly impede the flow of fluid. A simple duct, on the other hand, is not flowed through, so that a link installed therein does not need to provide a flow path.

The at least one solid electrolyte based fuel cell is preferably a so-called planar fuel cell with a planar solid electrolyte bordered on one side by a layer-shaped anode and on the other side by a layer-shaped cathode. The two electrodes form together with the electrolyte a so-called electrolyte/electrode unit.

It is advantageous if the at least one subassembly of the fuel cell assembly comprises at least one humidifying device, in particular a planar humidifying device, which has at least one electrically conductive component made of sheet metal, in particular a heating element. The heating element is in particular traversed by a supply duct through which heated cooling water from the fuel cell device can be conveyed.

The humidifying device preferably has at least one membrane humidifier, preferably a number of membrane humidifiers. A membrane humidifier is implemented in particular as a planar humidification cell comprising an operating gas chamber, a humidifying water chamber and a water permeable membrane disposed between the two chambers. At least one sheet metal heating element is preferably assigned to each water permeable membrane. The sheet metal heating elements here act in particular as electrically conductive components which are separated from one another and from the first terminal contact by water permeable membranes which are usually made of an electrically insulating material and in particular act as other components. Matching of the electrical potential at each of the heating elements to the electrical potential at the first terminal contact results in a significant reduction in heating element corrosion.

An electrically conductive link is preferably connected to each heating element and ultimately to the first terminal contact and/or at least one voltage source.

It has proved effective if the at least one subassembly of the fuel cell assembly comprises at least one electrically conductive component in the form of a metal conduit. Because of the potential equalization between the first terminal contact and the metal conduit, the diameter and length of such a metal conduit can be to a large extent freely selected. Such a conduit is preferably used to feed water into a fuel cell device and/or a humidifier device.

It is also advantageous if the at least one fuel cell device and the at least one subassembly are disposed in, in particular, a metal container, electrically insulated from said container. The container acts as contact protection, since because of the potential equalization between the first terminal contact of the fuel cell device and the at least one electrically conductive component, previously non-live components are now live and must be disposed in a contact-protected manner.

The fuel cell assembly according to the invention preferably has a fuel cell device and/or a humidifying device as described in WO 03/030287 A2 or WO 03/030288 A2.

In particular a polymer is used as material for implementing the solid electrolyte inside the electrolyte/electrode unit of a fuel cell. Of particular preference here is the polymer with the designation NAFION made by DuPont in Wilmington, Del. It is also preferred if a water permeable membrane of a planar membrane humidifier is constituted of the same material.

BRIEF DESCRIPTION OF THE SEVERAL VIEWS OF THE DRAWING

By way of example, FIGS. 1a to 7c will explain the fuel cell assembly according to the invention and the method according to the invention:

FIG. 1b shows an electrical equivalent circuit diagram of the fuel cell assembly according to FIG. 1a;

FIG. 2a schematically illustrates a fuel cell assembly according to the invention, based on a fuel cell assembly according to FIG. 1a;

FIG. 2b shows an electrical equivalent circuit diagram of the fuel cell assembly according to FIG. 2a;

FIG. 3b shows an electrical equivalent circuit diagram of the fuel cell assembly according to FIG. 3a;

FIG. 5b shows an electrical equivalent circuit diagram of the fuel cell assembly according to FIG. 5a;

FIG. 6a schematically illustrates a fuel cell assembly according to the invention, based on the fuel cell assembly according to FIG. 5a;

FIG. 6b shows an electrical equivalent circuit diagram of the fuel cell assembly according to FIG. 6a;

DESCRIPTION OF THE INVENTION

Figure 1A:
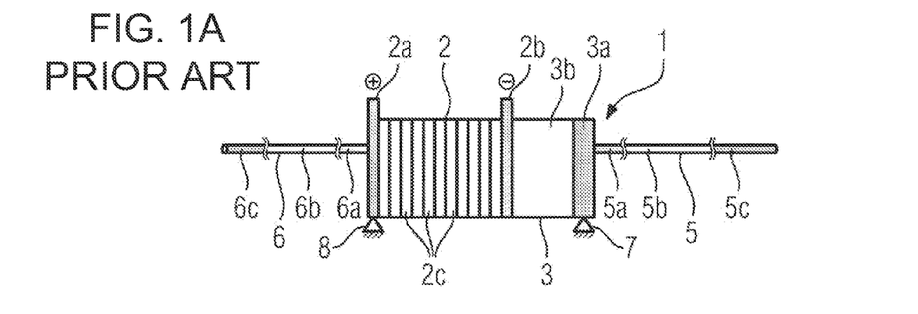
FIG. 1a schematically illustrates a fuel cell assembly according to the prior art, comprising a fuel cell device and a subassembly in the form of a humidifying device.

FIG. 1a schematically illustrates a fuel cell device 1 according to the prior art, comprising a fuel cell device 2 and a subassembly in the form of a humidifying device 3. The fuel cell assembly 1 is mounted in an electrically insulated manner on two supports 7, 8. The fuel cell device 2 comprises two terminal contacts 2a, 2b and a stack of planar fuel cells 2c, each having a solid electrolyte based electrode-electrolyte unit. The design of said fuel cell device 2 is shown merely schematically and will already be sufficiently familiar to the average person skilled in the art.

The two terminal contacts 2a, 2b are provided in the form of electrically conductive, in particular metal, pole plates. The humidifying device 3 has electrically conductive components 3a and also electrically insulating other components 3b. Connected to the humidifying device 3 is a supply line 5 which supplies the humidifying device 3 and the fuel cell device 2 with a fluid medium, here in the form of water, for example. Disposed on the side of the fuel cell device 2 facing away from the supply line 5 is another supply line 6 through which the fluid medium is discharged. The arrangement of the supply lines 5, 6 is only schematically illustrated here and can be implemented in a completely different manner. In addition, the supply lines 5, 6 are representative of all the supply lines required for operating the fuel cell assembly, such as a supply line for fuel gas, a supply line for oxidation gas, etc. For the sake of clarity, however, no other supply lines have been shown here. The supply line 5 has different segments, the segment 5a being made of metal, the segment 5b of an electrically insulating material such as plastic or ceramic, and the segment 5c again of metal. The supply line 6 has the same structure as supply line 5, the segment 6a being made of metal, the segment 6b of an electrically insulating material such as plastic or ceramic, and the segment 6c again of metal. In general, the supply lines 5, 6 can be disposed only on one side of the fuel cell assembly 1 or, as illustrated, connected on opposite sides of the fuel cell assembly 1.

Figure 1B:
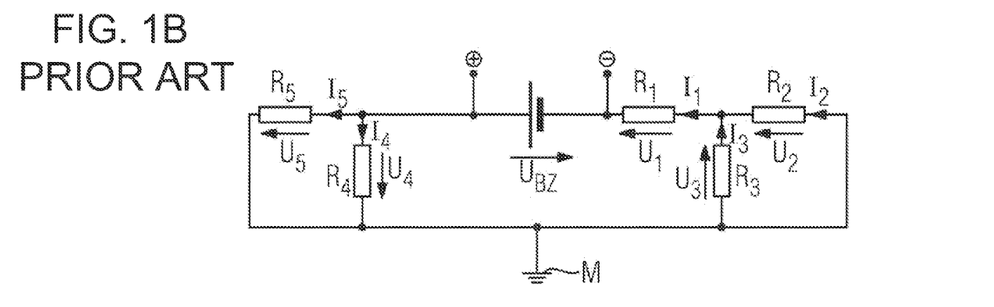

FIG. 1b shows an electrical equivalent circuit diagram of the fuel cell assembly 1 according to FIG. 1a. The fuel cell device 2 is here represented by a battery which supplies the voltage $U_{BZ}$. The two terminal contacts 2a, 2b are represented by the positive and negative contacts. The humidifying device 3 including the segment 5a of the supply line 5 is represented by means of an ohmic resistance $R_1$ through which a current $I_1$ flows and across which a voltage $U_1$ is dropped. The segments 5b and 5c of the supply line 5 are represented by an ohmic resistance $R_2$ through which a current $I_2$ flows and across which a voltage $U_2$ is dropped. The support 7 is represented by an ohmic resistance $R_3$ via which a current $I_3$ flows and across which a voltage $U_3$ is dropped. The support 8 is represented by an ohmic resistance $R_4$ via which a current $I_4$ flows and across which a voltage $U_4$ is dropped. The segments 6b and 6c of the supply line 6 are represented by an ohmic resistance $R_5$ through which a current $I_5$ flows and across which a voltage $U_5$ is dropped. A ground connection M is provided between the resistance $R_3$ and the resistance $R_4$. If the value of the ohmic resistance $R_1$ is constant, the current $I_1$ depends on whether the ohmic resistances $R_2$ and $R_3$ are high or low. If they are high, they determine the current $I_1$, which is then correspondingly low.

If the current $I_1$ is low, a small voltage is dropped across the ohmic resistance $R_1$. However, if the ohmic resistances $R_2$ and $R_3$ are low compared to the ohmic resistance $R_1$, a comparatively high current $I_1$ flows which causes a large voltage drop across the humidifying device 3. If the voltage $U_1$ attains the corrosion potential of the materials of the electrically conductive components 3a and/or 5a, the latter may exhibit corrosion effects. The corrosion products formed are entrained by the fluid medium which is fed into the humidifying device 3 and into the fuel cell device 2 by means of the supply line 5 in a supply duct, and result in blockages or other undesirable effects such as electrode contamination, reduction of the ion conductivity of the electrolyte, etc. elsewhere, e.g. in a fuel cell 2c. The amount of said corrosion products formed depends on the size of the current $I_1$, with undesirable amounts of corrosion products being formed even in the low mA range.

Figure 2A:
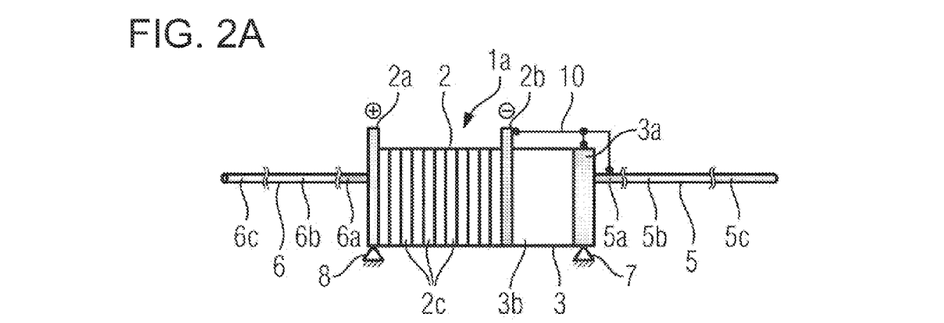

FIG. 2a now schematically illustrates a fuel cell assembly 1a according to the invention, based on the fuel cell assembly 1 according to FIG. 1a. The fuel cell assembly 1a has an electrically conductive link 10 which connects the first terminal contact 2b to the electrically conductive component 3a of the humidifying device 3 and to the electrically conductive segment 5a of the supply line 5. By means of the electrically conductive link 10, the electrical potential at the electrically conductive component 3a and the electrically conductive segment 5a is matched to the electrical potential at the terminal contact 2b. The electrically conductive link 10 is implemented here in the form of a metal wire.

Figure 2B:
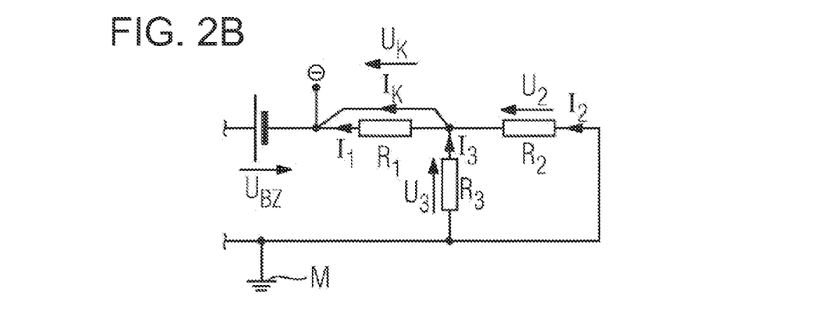

FIG. 2b shows a section of an electrical equivalent circuit diagram of the fuel cell assembly 1a according to FIG. 2a. The equivalent circuit diagram (right-hand branch) is essentially the same as the equivalent circuit diagram according to FIG. 1b (right-hand branch), wherein the electrically conductive link 10 now bypasses the ohmic resistance $R_1$. A short-circuit current $I_K$ now flows via the link 10, so that the flow of current via the ohmic resistance $R_1$ is completely or almost completely eliminated. As a result, corrosion can no longer occur on the electrically conductive component 3a and/or on the electrically conductive segment 5a of the supply line 5.

Figure 3A:
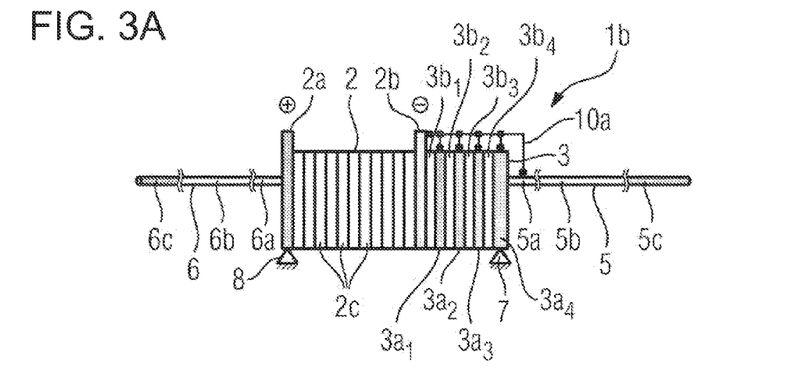
FIG. 3a schematically illustrates another fuel cell assembly according to the invention, comprising a fuel cell device and a subassembly in the form of a humidifying device.

FIG. 3a schematically illustrates another fuel cell assembly 1b according to the invention, comprising a fuel cell device 2 and a subassembly in the form of a humidifying device 3. In this exemplary embodiment, the humidifying device 3 has not just one electrically conductive component but a succession of electrically conductive components $3a_1$, $3a_2$, $3a_3$, $3a_4$, e.g. in the form of metal heating elements of the kind frequently used in membrane humidifiers. Located between the electrically conductive components $3a_1$, $3a_2$, $3a_3$, $3a_4$ are less electrically conductive other components i.e. electrically insulating other components $3b_1$, $3b_2$, $3b_3$, $3b_4$, e.g. in the form of water permeable membranes or electrically insulating seals. The electrically conductive components $3a_1$, $3a_2$, $3a_3$, $3a_4$ are connected by an electrically conductive link 10a to the first terminal contact 2b. The electrically conductive link 10a is implemented here in the form of a metal wire. For a more detailed representation of the design of the humidifying device 3, see also FIG. 4.

Figure 3B:
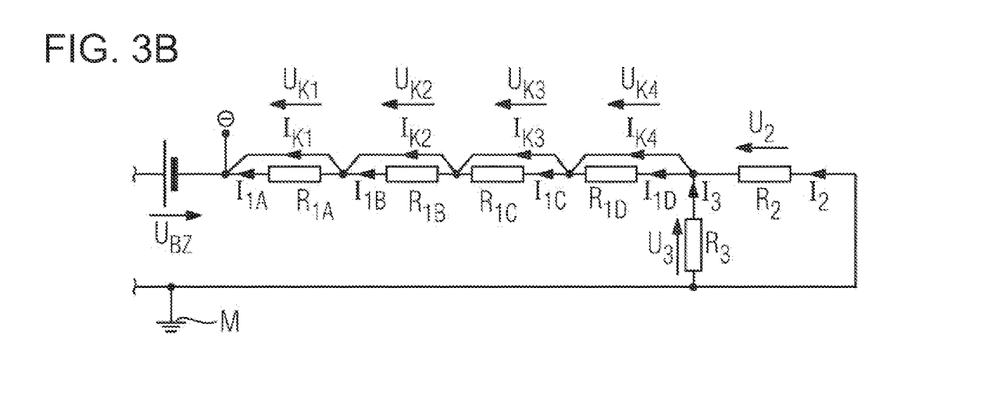

FIG. 3b now shows a section of the electrical equivalent circuit diagram of the fuel cell assembly 1b (right-hand branch) according to FIG. 3a. Here the electrically insulating other component $3b_1$ is represented by the ohmic resistance $R_{1a}$, the electrically insulating other component $3b_2$ is represented by the ohmic resistance $R_{1b}$, the electrically insulating other component $3b_3$ is represented by the ohmic resistance $R_{1c}$, and the electrically insulating other component $3b_4$ is represented by the ohmic resistance $R_{1d}$. As a result of the electrically conductive link 10a shown in FIG. 3a between the electrically conductive components $3a_1$, $3a_2$, $3a_3$, $3a_4$ and the first terminal contact 2b, the resistances $R_{1a}$, $R_{1b}$, $R_{1c}$, $R_{1d}$ are bypassed. A short-circuit current $I_k$ which appears at each of the resistances $R_{1a}$, $R_{1b}$, $R_{1c}$, $R_{1d}$ depending on the respective resistance value, flows via the electrically conductive link 10a.

Since in this example the ohmic resistances $R_{1a}$, $R_{1b}$, $R_{1c}$, $R_{1d}$ have largely the same value, the same short-circuit current $I_{k1}$, $I_{k2}$, $I_{k3}$, $I_{k4}$ is produced in the electrically conductive link 10a in the respective bypass region. Across the link 10a, whose resistance is considerably less than that of the electrically insulating components $3b_1$, $3b_2$, $3b_3$, $3b_4$, a voltage $Uk_1 \ldots Uk_n$ is dropped which no longer causes corrosion on the electrically conductive components $3a_1$, $3a_2$, $3a_3$, $3a_4$. The useful life of the fuel cell assembly 1b is lengthened.

Figure 4:
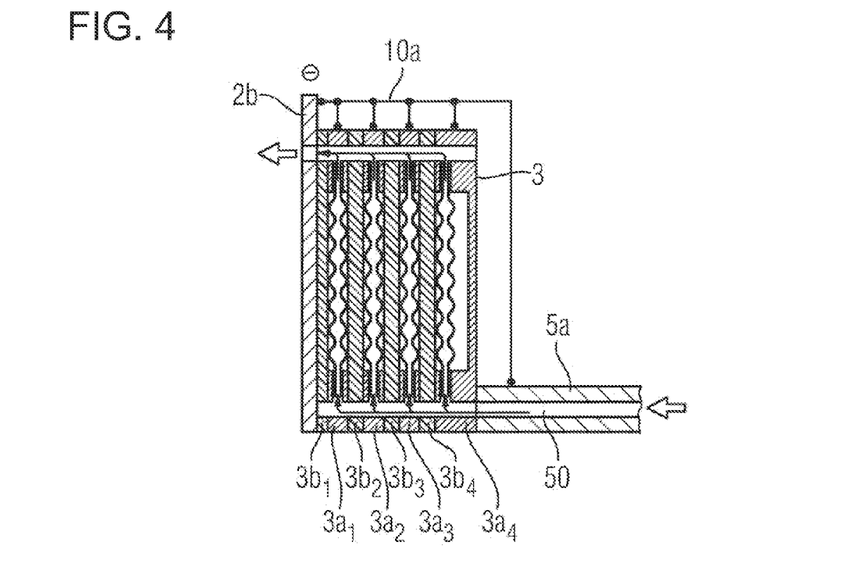
FIG. 4 shows a cross-section through a detail of the fuel cell assembly according to FIG. 3a in the region of the humidifying device.

FIG. 4 shows a detail of the fuel cell assembly 1b according to FIG. 3a. Shown here in a sectional view is the region between the electrically conductive segment 5a of the supply line 5 and the first terminal contact 2b of the fuel cell device 2. It can be seen that in the electrically conductive segment 5a of the supply line 5 a supply duct 50 is disposed, via which a fluid medium can be fed into the humidifying device 3 (see arrow). The electrically conductive components $3a_1$, $3a_2$, $3a_3$, $3a_4$ are separated from one another by means of the additional electrically insulating components $3b_1$, $3b_2$, $3b_3$, $3b_4$ and also insulated from the first terminal contact 2b as long no fluid medium is present. However, if the fluid medium is fed in, corrosion currents can form between the electrically conductive components $3a_1$, $3a_2$, $3a_3$, $3a_4$ and the first terminal contact 2b unless the electrically conductive link 10a provided according to the invention in the form of a metal wire is present.

Figure 5A:
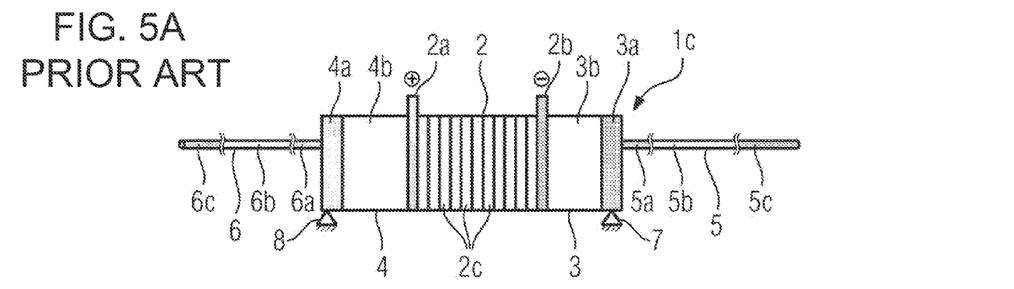
FIG. 5a schematically illustrates another fuel cell assembly according to the prior art, comprising a fuel cell device and two subassemblies in the form of humidifying devices.

FIG. 5a schematically illustrates another fuel cell assembly 1c according to the prior art, comprising a fuel cell device 2 and two subassemblies in the form of humidifying devices 3, 4. The humidifying device 4 is of essentially the same design as the humidifying device 3 according to FIG. 1a or 2a.

Figure 5B:
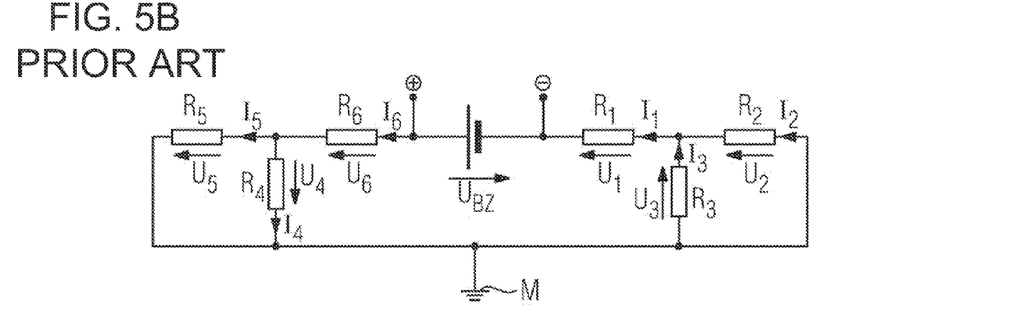

FIG. 5b shows an electrical equivalent circuit diagram of the fuel cell assembly 1c according to FIG. 5a. Whereas the right-hand part of the equivalent circuit diagram corresponds to the right-hand part according to FIG. 1b, in the left-hand part of the equivalent circuit diagram the second humidifying device 4 is shown in a similar manner. The second humidifying device has an electrically conductive component 4a and another electrically insulating component $4b$, the ohmic resistance $R_6$ representing the electrically insulating other component $4b$. The ohmic resistance $R_5$ essentially represents the segments $6b$ and $6c$ of a supply line 6, wherein the segment $6b$ is made of an electrically insulating material and the segment $6c$ is made of an electrically conductive, in particular metal material. A current $I_5$ flows via the resistance $R_5$ and a current $I_6$ flows via the resistance $R_6$. A voltage $U_5$ is dropped across the resistance $R_5$ and a voltage $U_6$ is dropped across the resistance $R_6$. The resistance $R_4$ represents, as already in FIG. $1b$, the support 8.

Figure 6A:
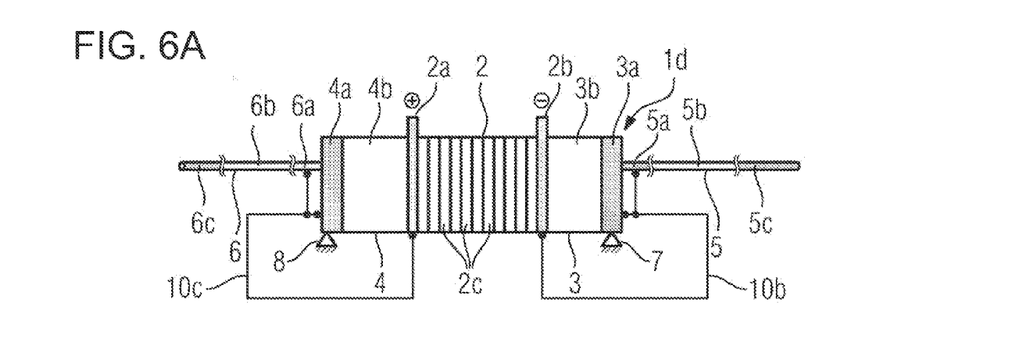

FIG. $6a$ now schematically illustrates a fuel cell assembly $1d$ according to the invention, based on the fuel cell assembly $1c$ according to FIG. $5a$. In this exemplary embodiment the electrically conductive component $3a$ and the electrically conductive segment $5a$ of the supply line 5 are connected to the first terminal contact $2b$ by means of an electrically conductive link $10b$. In addition, the electrically conductive component $4a$ of the second humidifying device 4 and the electrically conductive segment $6a$ of the supply line 6 are connected to the second terminal contact $2a$ of the fuel cell device 2 by means of an electrically conductive second link $10c$. The electrically conductive first link $10b$ and the electrically conductive second link $10c$ are implemented here in the form of metal wires.

Figure 6B:
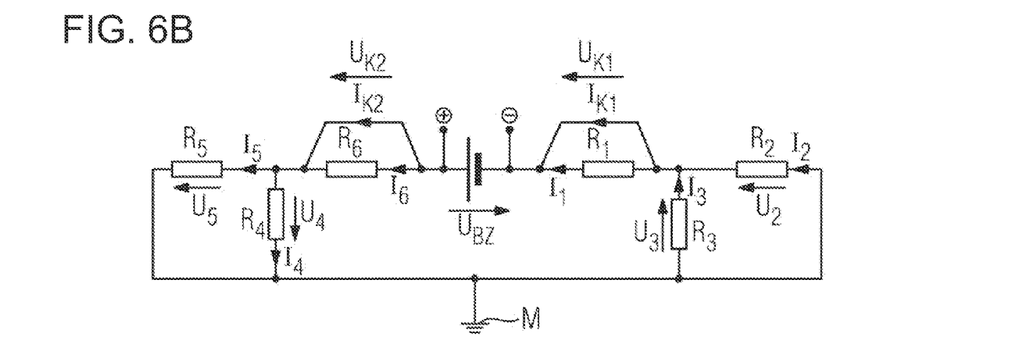

FIG. $6b$ shows the electrical equivalent circuit diagram of the fuel cell assembly $1d$ according to FIG. $6a$. It can be seen here that, by means of the two electrically conductive links $10b$, $10c$, the humidifying devices 3, 4 are electrically bypassed and therefore the currents $I_1$ and $I_6$ are completely or almost completely prevented. Corrosion in the region of the electrically conductive components $3a$, $5a$, $4a$, $6a$ is reliably prevented and the lifetime of the fuel cell assembly $1d$ is considerably extended.

Figure 7A:
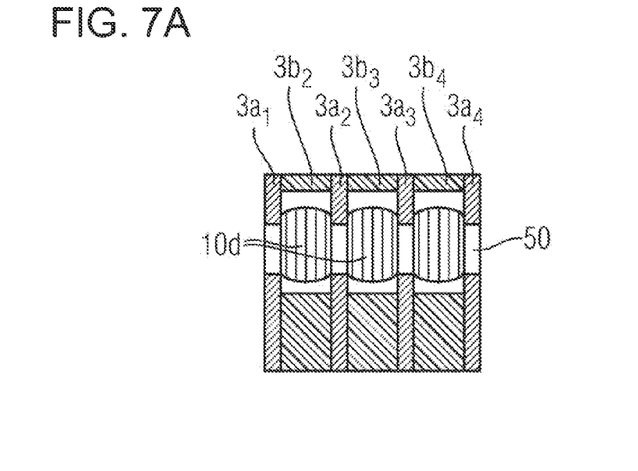
FIG. 7a shows a cross-section through a duct or supply duct with electrically conductive links disposed therein.

FIG. $7a$ schematically illustrates a cross-section through a duct or a supply duct 50 with electrically conductive links $10d$ disposed therein. Such an arrangement may be present, for example, in a humidifying device, wherein here too the electrically conductive components $3a_1$, $3a_2$, $3a_3$, $3a_4$ (compare FIG. 4) which are isolated from one another by the other electrically insulating components $3b_1$, $3b_2$, $3b_3$, $3b_4$ are shown. The electrically conductive components $3a_1$, $3a_2$, $3a_3$, $3a_4$ have openings for implementing the duct or the supply duct 50 which are dimensioned slightly smaller than the openings for implementing the duct or the supply duct 50 in the other electrically insulating components $3b_2$, $3b_3$, $3b_4$. If they are disposed in a supply duct 50 through which a fluid medium flows, the electrically conductive links $10d$ are made of a metal knitted fabric permeable to the fluid medium, said fabric being supported on both sides on an electrically conductive component $3a_1$, $3b_1$ and elastically pressed together and retained by the latter. However, if such an electrically conductive link is disposed in an internally manifolded stack system of a fuel cell assembly, care must be taken to ensure that the arrangement of the link or links does not significantly impede the flow of the supply duct 50. If the electrically conductive links $10d$ are disposed in a simple duct which does not provide a flow path, they can also be made impermeable to a fluid medium.

Figure 7B:
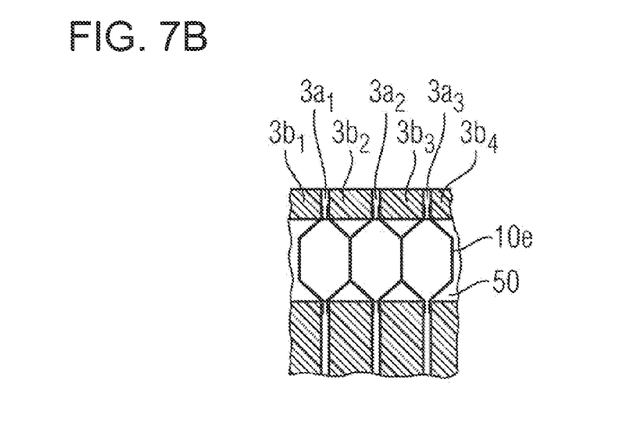
FIG. 7b shows a cross-section through a duct or supply duct with additional electrically conductive links disposed therein.

FIG. $7b$ schematically illustrates a cross-section through another duct or supply duct 50 in which other electrically conductive links $10e$ are provided. In this embodiment, the electrically conductive components $3a_1$, $3a_2$, $3a_3$ have an integrated or separate electrically conductive link $10e$ in the form of a resiliently implemented convexity, said links $10e$ abutting one another inside the duct or supply duct 50 and allowing potential equalization between the electrically conductive components $3a_1$, $3a_2$, $3a_3$. In this arrangement, in a supply duct 50 through which a fluid medium is to flow, the links $10e$ are permeable and have a negligible effect on the flow of the medium. Such permeability can be implemented e.g. by openings, slots and the like disposed in the electrically conductive components $3a_1$, $3a_2$, $3a_3$ in the region of the link $10e$. If the link $10e$ is disposed in a simple duct which does not provide a flow path, permeability to a fluid medium is not required.

A plurality of additional electrically conductive links disposed in a duct which does not provide a flow path for a fluid medium or in a duct which does provide a flow path for a fluid medium can be used as alternatives to the links shown in FIGS. $7a$ and $7b$. It has also proved effective to provide the connection by means of a simple metal wire inside or outside a duct or supply duct.

Figure 7C:
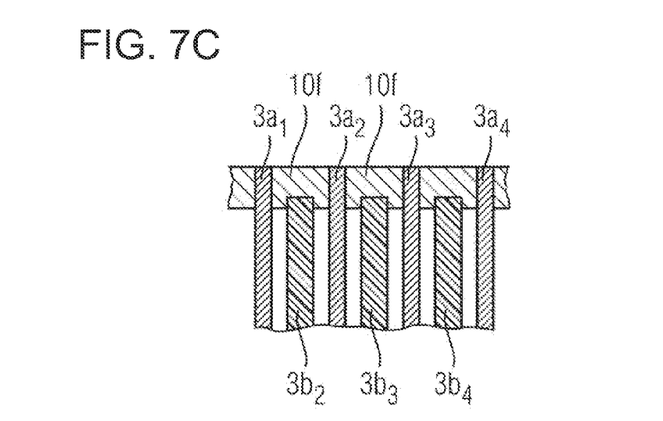
FIG. 7c shows a cross-section through a region of a fuel cell assembly with electrically conductive links in the form of separators.

FIG. $7c$ shows a cross-section through a region of a fuel cell assembly comprising electrically insulating components $3b_2$, $3b_3$, $3b_4$ and electrically conducting components $3a_1$, $3a_2$, $3a_3$, $3a4$. The electrical potentials of the electrically conducting components $3a_1$, $3a_2$, $3a_3$, $3a_4$ are matched to one another by electrically conductive links $10f$ in the form of separators made of a graphite-filled, electrically conducting plastic, in particular an elastomer, said separators acting as flat seals between the electrically conducting components $3a_1$, $3a_2$, $3a_2$, $3a_4$ and fixing the electrically insulating components $3b_2$, $3b_3$, $3b_4$ in position.

With knowledge of the present invention, it will be possible for the average person skilled in the art to vary the exemplary embodiments illustrated without departing from the inventive idea. For example, instead of planar fuel cells, tubular fuel cells, etc. can easily be used. Instead of a humidifying device, another subassembly can be used and/or the sequence of electrically conductive components and other, essentially electrically insulating components can basically be modified. In addition, the number of electrically conductive components and other, essentially electrically insulating components can be varied, i.e. increased or reduced. The type of link can be easily changed by using, for example, a metal knitted fabric, conductive ceramic or plastic parts, etc. instead of a metal wire. Also, the illustrated dimensions of the fuel cell assembly and its constituent elements are merely selected for schematic representation and are not indicative of the actual sizes and size ratios.

The invention claimed is:

1. A fuel cell assembly comprising:
   at least one fuel cell device having at least one solid electrolyte-based fuel cell and at least two terminal contacts for tapping off an electrical voltage produced by said at least one fuel cell device, said at least one fuel cell being disposed between said at least two terminal contacts;
   at least one humidifier having at least one heating element and at least one other component, said at least one other component being disposed between a first of said terminal contacts and said at least one heating element on a side of said first terminal contact facing away from said at least one fuel cell, and said at least one other component having a lower electrical conductivity than said first terminal contact and said at least one heating element; and
   at least one supply duct for conveying a fluid medium and connecting said first terminal contact to said at least one heating element through said at least one other component;
   said at least one heating element being connected to said first terminal contact for matching an electrical potential at said at least one heating element to an electrical potential present at said first terminal contact, with a maximum potential difference of 3 volts being present between said at least one heating element and said first terminal contact;

said heating element configured to be heated by the fluid medium conveyed by said supply duct and to heat a fuel gas passing along said heating element.

2. The fuel cell assembly according to claim 1, wherein said at least one supply duct is configured to convey a fluid medium selected from the group consisting of at least one of water, steam and a steam-containing gas and extends through said at least one humidifier and said at least one fuel cell device.

3. The fuel cell assembly according to claim 1, wherein said at least one humidifier has at least two heating elements and at least two other components, each of said heating elements being disposed between two of said other components and/or each of said other components being disposed between two of said heating elements.

4. The fuel cell assembly according to claim 1, which further comprises at least one electrically conductive link interconnecting said first terminal contact and said at least one heating element.

5. The fuel cell assembly according to claim 4, wherein said at least one electrically conductive link interconnects said first terminal contact and said at least one heating element on a periphery and/or in an interior of said at least one fuel cell device and of said at least one humidifier.

6. The fuel cell assembly according to claim 4, wherein said at least one electrically conductive link electrically conductively connects said first terminal contact to said at least one heating element through said at least one supply duct or a separate duct.

7. The fuel cell assembly according to claim 1, wherein said at least one humidifier includes at least one electrically conductive component in the form of a metal conduit.

8. The fuel cell assembly according to claim 1, which further comprises a container in which said at least one fuel cell device and said at least one humidifier are disposed and are electrically insulated from said container.

9. The fuel cell assembly according to claim 1, wherein said at least one fuel cell is a planar fuel cell.

10. The fuel cell assembly according to claim 1, wherein said at least one other component is made of an electrically insulating material.

11. The fuel cell assembly according to claim 1, wherein said fuel cell assembly has an internally manifolded stack.

12. A method for operating a fuel cell assembly, the method comprising the following steps:

providing the fuel cell assembly with at least one fuel cell device having at least one solid electrolyte-based fuel cell and at least two terminal contacts for tapping off an electrical voltage produced by the fuel cell device, the at least one fuel cell being disposed between the at least two terminal contacts;

providing at least one humidifier having at least one heating element and at least one other component, the at least one other component being disposed between a first of the terminal contacts and the at least one heating element on a side of the first terminal contact facing away from the at least one fuel cell and the at least one other component having a lower electrical conductivity than the first terminal contact and the at least one heating element;

conveying a fluid medium with at least one supply duct connecting the first terminal contact to the at least one heating element through the at least one other component; and connecting the at least one heating element to the first terminal contact for matching an electrical potential at the at least one heating element to an electrical potential present at the first terminal contact by setting a maximum potential difference of 3 volts between the at least one heating element and the first terminal contact;

wherein the heating element is heated by the fluid medium conveyed by the supply duct and heats a fuel gas passing along the heating element.

13. The method according to claim 12, which further comprises conveying at least one of water or steam or a steam-containing gas through the at least one supply duct as a fluid medium.

14. The fuel cell assembly according to claim 1, wherein said at least one other component is a water-permeable membrane made of an electrically insulating material.

* * * * *